United States Patent
Tsao

(10) Patent No.: US 7,339,836 B2
(45) Date of Patent: Mar. 4, 2008

(54) DATA COLLECTOR

(75) Inventor: Ming-Jen Tsao, Hsin Chu (TW)

(73) Assignee: Ace Dragon Corp., Hsin Chu (TW)

( * ) Notice: Subject to any disclaimer, the term of this patent is extended or adjusted under 35 U.S.C. 154(b) by 260 days.

(21) Appl. No.: 11/274,119

(22) Filed: Nov. 16, 2005

(65) Prior Publication Data

US 2007/0109830 A1    May 17, 2007

(51) Int. Cl.
*G11C 7/10*    (2006.01)

(52) U.S. Cl. .................. 365/189.05; 365/201; 374/100; 710/52; 324/760; 235/482

(58) Field of Classification Search ........... 365/189.05, 365/201; 374/100; 710/52; 324/760; 235/482
See application file for complete search history.

(56) References Cited

U.S. PATENT DOCUMENTS

| | | | | |
|---|---|---|---|---|
| 4,306,219 A | * | 12/1981 | Main et al. .............. 340/10.41 |
| 4,420,819 A | * | 12/1983 | Price et al. .................... 710/52 |
| 4,523,460 A | * | 6/1985 | Strickler et al. .............. 73/200 |
| 4,546,436 A | * | 10/1985 | Schneider et al. .......... 600/361 |
| 4,868,893 A | * | 9/1989 | Hammond .................. 398/107 |
| 5,410,141 A | * | 4/1995 | Koenck et al. ........ 235/472.02 |
| 5,530,343 A | * | 6/1996 | Bowers et al. .............. 324/173 |
| 5,616,906 A | * | 4/1997 | Kumar .................. 235/472.01 |
| 5,736,726 A | * | 4/1998 | VanHorn et al. ....... 235/472.02 |
| 5,875,415 A | * | 2/1999 | Lieb et al. .................. 702/122 |
| 5,978,569 A | * | 11/1999 | Traeger ...................... 709/244 |
| 6,115,678 A | * | 9/2000 | Lieb et al. .................. 702/122 |
| 6,167,766 B1 | * | 1/2001 | Dunn et al. .............. 73/863.01 |
| 6,189,109 B1 | * | 2/2001 | Sheikh et al. .................. 714/1 |
| 6,202,491 B1 | * | 3/2001 | McCarty et al. .............. 73/659 |
| 6,472,988 B1 | * | 10/2002 | Feld et al. ............... 340/573.1 |
| 6,539,400 B1 | * | 3/2003 | Bloomfield et al. ...... 707/104.1 |
| 6,577,733 B1 | * | 6/2003 | Charrin ...................... 380/251 |
| 6,671,659 B2 | * | 12/2003 | Troia et al. .................. 702/188 |
| 6,987,927 B1 | * | 1/2006 | Battaglia et al. ............ 386/117 |
| 7,004,625 B2 | * | 2/2006 | Egidio .......................... 374/166 |
| 7,162,549 B2 | * | 1/2007 | Mambakkam et al. ........ 710/16 |
| 7,232,063 B2 | * | 6/2007 | Fandel et al. ............... 235/383 |

FOREIGN PATENT DOCUMENTS

| JP | 411338789 A | * | 12/1999 |
|---|---|---|---|
| JP | 02005176300 A | * | 6/2005 |

* cited by examiner

*Primary Examiner*—Viet Q. Nguyen
(74) *Attorney, Agent, or Firm*—Troxell Law Office, PLLC

(57) ABSTRACT

A data collector to be installed in an electrical storage device has a data reader and a base. The data reader is to be connected to the electrical storage device to store status data detected by the electrical storage device. The stored data has a specific format. The stored data in the data reader can be transmitted to a computer through the base. The computer can then generate statistical graphs to show the status data. According to the graphs, whether or not the interior status of the electrical storage device is normal can be easily monitored.

15 Claims, 5 Drawing Sheets

DATA COLLECTOR

BACKGROUND OF THE INVENTION

1. Field of the Invention

The present invention relates to a data collector, in particular to a data collector that is detachable from a target electrical apparatus such as an electrical moisture-proof cabinet.

2. Description of the Related Art

In some environments, the humidity in the atmosphere can easily lead digital products, such as digital cameras, video cameras, notebook computers, electronic dictionaries, PDAs, microphones, chargers and other electronic devices, to lose their original precision or accelerate their aging process. For optical lenses, they may become unusable if mildew grows on their surfaces. In addition, data storage media, such as magnetic tapes, optical disks, flash memory, filmstrips, microfilm, cassette tapes, CDs, LDs, DVDs and disk records, may also be affected by humidity and lose stored data. Other items, such as microscopes, theodolites, precision measuring instruments, reagents, chemicals, powder materials, IC packages, LEDs, LCDs and epoxies, can all easily absorb moisture from the air that can cause material deterioration or oxidization to electrical contacts.

Conventional storage cabinets are used to store electrical or electronic items. The storage cabinets have a control box on which a display is mounted to show readings of the temperature and humidity status inside the storage cabinet. In practice, multiple storage cabinets are often used to store different types of items. The temperature and humidity conditions of each storage cabinet must be regularly collected and recorded by an operator who must physically check all of the cabinets. The collected and recorded data is subsequently transmitted to a computer to generate statistical graphs to be monitored by control personnel. The foregoing job, which requires an operator to physically check each cabinet, is inefficient and has a great probability for human error.

Another conventional type of storage cabinet can transmit data to a computer through a cable. However, connecting multiple cables between multiple storage cabinets and a computer requires complex layout procedures. In addition, the location of the storage cabinets must be considered, and adding an additional hub to connect all the cables to the computer may be necessary. An obvious drawback is that a storage cabinet cannot be conveniently moved to a different location after it is connected to the computer.

To overcome the shortcomings, the present invention provides a data collector that is installed in a storage cabinet to automatically record environments parameters so as to mitigate and obviate the aforementioned problems.

SUMMARY OF THE INVENTION

An objective of the present invention is to provide a data collector to store status data detected by an electrical storage device to eliminate the need to designate an operator to regularly record the desired data so that human error in recording the data can be avoided.

In addition, when the data collector is connected to a computer, the computer can generate statistical graphs based on the stored data to show temperature or humidity states. From the graphs, status of the conditions inside the electrical storage cabinets can be easily monitored.

The data collector to be installed in an electrical storage device has a data reader and a base. The data reader is to be connected to the electrical storage device to store status data detected by the electrical storage device. The stored data has a specific format.

The features and structure of the present invention will be more clearly understood when taken in conjunction with the accompanying drawings.

DETAILED DESCRIPTION OF THE PREFERRED EMBODIMENT

The present invention provides a data recorder to electronically record readings of the environmental conditions in a storage cabinet to assure that objects in the storage cabinet are stored under ideal conditions.

Figure 1:
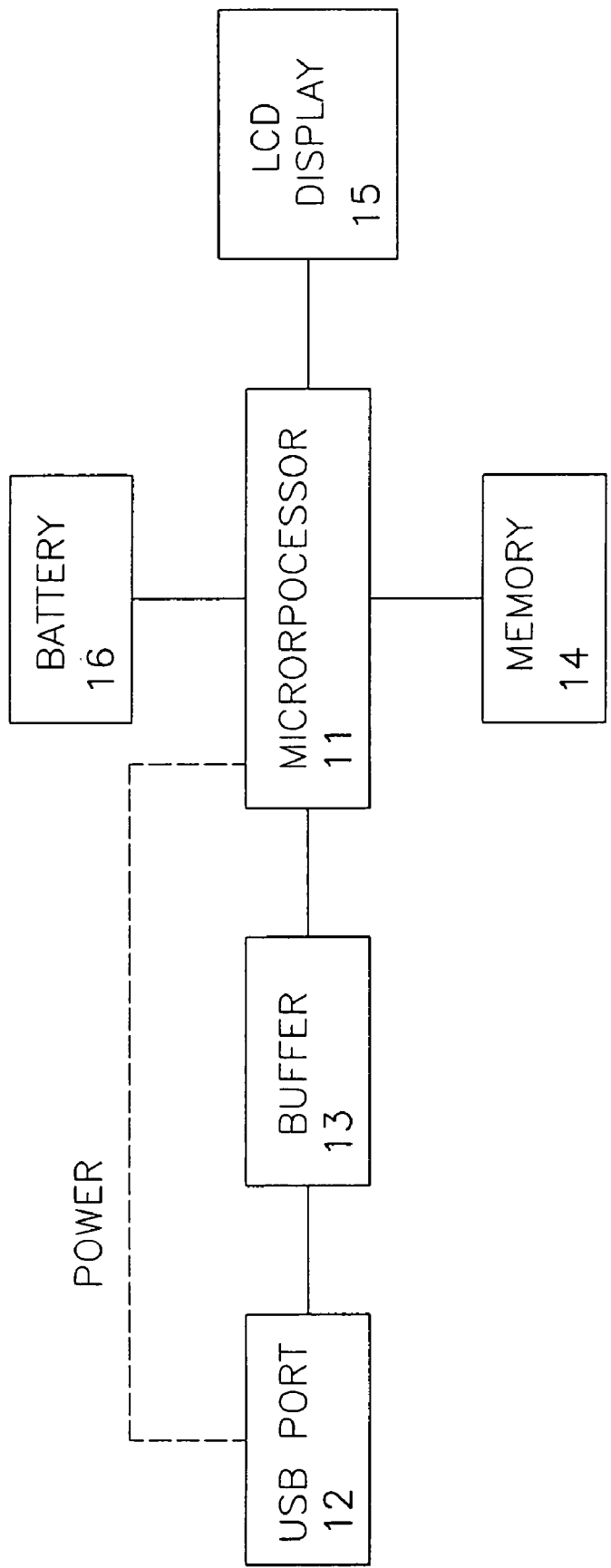
FIG. 1 is a block diagram of a first embodiment of a data collector in accordance with the present invention.

With reference to FIG. 1, a first embodiment of a data collector in accordance with the present invention is composed of a microprocessor (11), a USB port (12), a buffer (13), a memory (14), an LCD display (15) and a battery (16).

The USB port (12) serves as a data transmission port that receives data detected by a control box (not shown) mounted in the storage cabinet. The USB port (12) can revive a power signal with 1-10K Hz frequency and 0-15 amps current from the storage cabinet. The buffer (13) is connected to the USB port (12) to temporarily store data received or to be transmitted. The microprocessor (11) connects to the buffer (13), the memory (14), the LCD display (15) and the battery (16). The microprocessor (11) can receive and process the data output from the buffer (13), or transmit the processed data to the buffer (13). Further, the microprocessor (11) can also receive the power signal. The memory (14) is used to store the executing code of the microprocessor (11). Operating statuses of the data collector are shown on the LCD display (15), such as "operating", "idle", "data full" as well as connecting information between the data collector and a computer (PC). The battery (16) supplies an operating voltage to the microprocessor (11)

When in use, the data collector is connected to a control box of the storage cabinet through the USB port (12). The control box also has a corresponding USB port to be linked to the USB port (12) and transmits data collected by the sensors of the storage cabinet to the data collector. Some parameters of the data collector can be pre-set, for example the maximum amount of collected data, the periods of data collecting and series number of modules. After the status data have been completely transferred to the data collector, the data collector is detached from the control box and then connected to a computer/server through the USB port (12). The microprocessor (11) transmits the collected data to the computer/server. Based on the collected data, the computer/server can generate different statistical graphs to monitor whether or not the conditions in the storage space in the storage cabinet are normal. The statistical graphs can include the temperature, humidity and time drawings. The storage cabinet can be an electronic moisture-proof device, an ultra low-moisture cabinet, a precision oven, an electronic moisture-proof coffer and a fireproof cabinet, etc.

Figure 2:
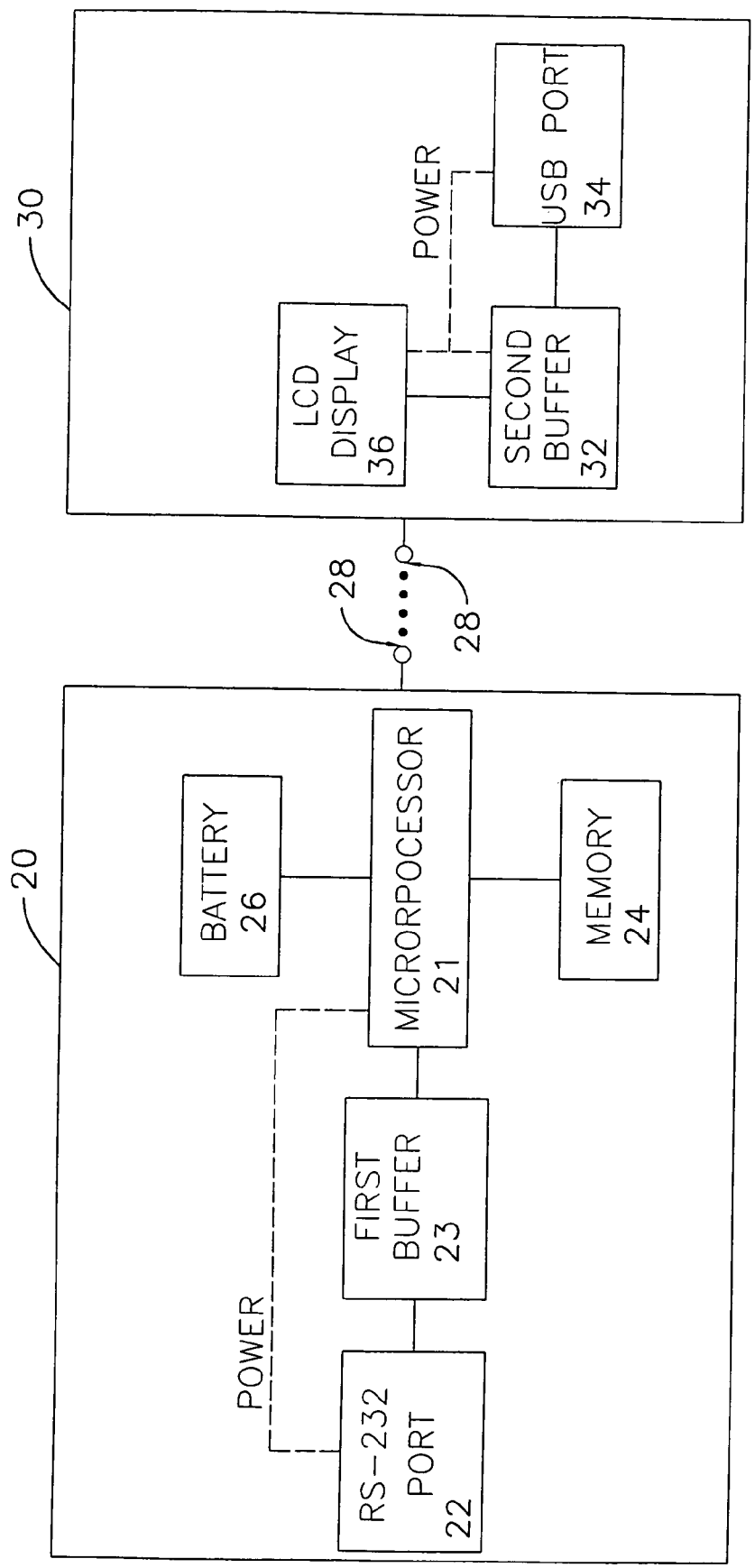
FIG. 2 is a block diagram of a second embodiment of a data collector composed of a data reader and a base in accordance with the present invention.

With reference to FIG. 2, a second embodiment of a data collector in accordance with the present invention includes a data reader (20) and a base (30). The data reader (20) comprises a microprocessor (21), an RS232 port (22), a first buffer (23), a memory (24), a battery (26) and a data transmitting terminal (28).

The RS232 port (22) is a data transmission port that receives data detected by a control box (not shown) mounted in a storage cabinet. The RS232 port (22) revives a power signal with 1-10K Hz frequency and 0-15 amps current from the storage cabinet. The first buffer (23) is connected to the RS232 port (22) to temporarily store data received or to be transmitted. The microprocessor (21) connects to the first buffer (23), the memory (24) and the battery (26). The microprocessor (21) receives and processes the data output from the buffer (23), or transmits the processed data to the first buffer (23). Further, the microprocessor (21) can also receive the power signal. The memory (24) is used to store the executing code of the microprocessor (21). The battery (26) supplies an operating voltage to the microprocessor (21).

The base (30) has a data receiving terminal (38) to be connected to the data transmitting terminal (28) so as to receive the data output from the data reader (20). The base (30) comprises a second buffer (32), an USB port (34) and an LCD display (36). The second buffer (32) temporarily stores the data received or to be transmitted. The received data can further be transmitted to a computer through the USB port (34). Operating statuses of the microprocessor (21) are shown on the LCD display (36), such as "operating", "idle", "data full" as well as other connecting information between the data collector and a computer (PC).

Figure 3A:
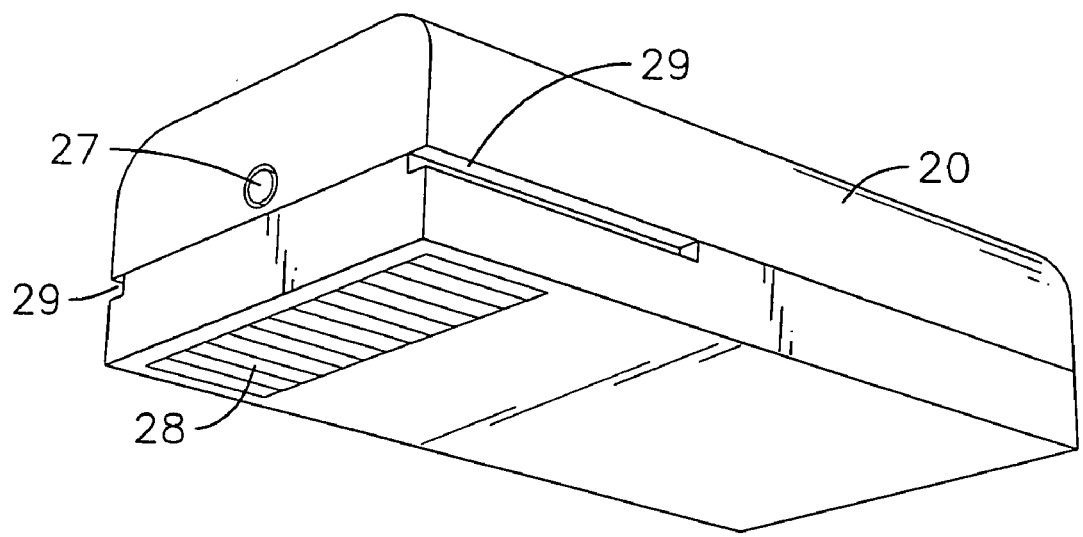
FIG. 3A is a perspective view of a data reader in accordance with the second embodiment of the present invention in FIG. 2.
Figure 3B:
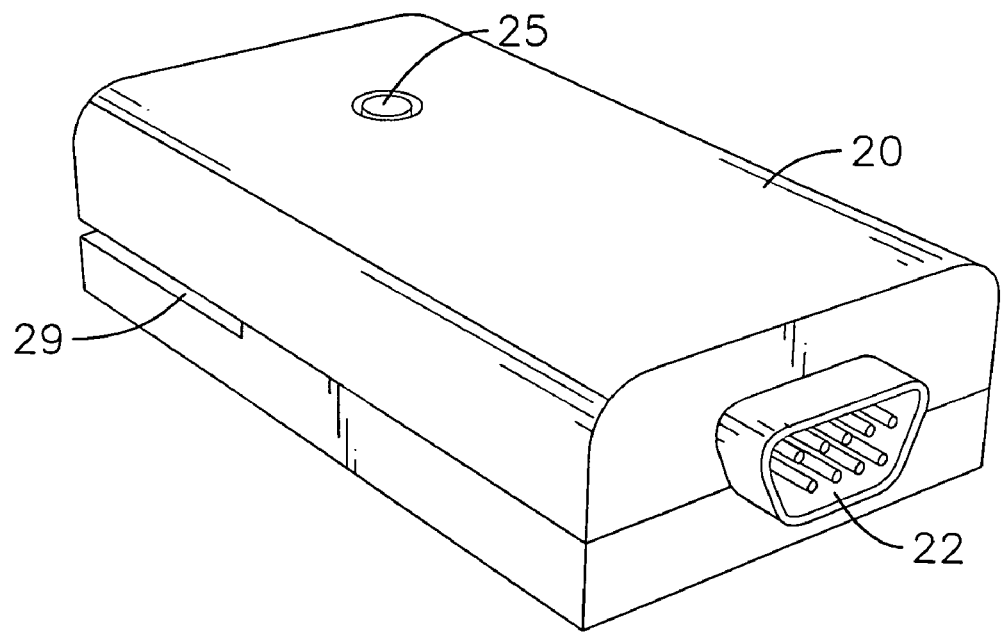
FIG. 3B is a perspective view of the data reader in FIG. 3A.

With reference to FIGS. 3A and 3B, the data reader (20) has a rectangular body with a bottom surface, a top surface and side surfaces. The RS232 port (22) is formed on one side surface. A switch (25) in the form of a button is mounted on the top surface of the data reader (20) to turn on or turn off the data reader (20). An indicating light (27), for example an LED, is mounted on another side surface of the data reader (20). When the data reader (20) is powered, the indicating light (27) is activated. The data transmitting terminal (28) is formed by multiple contacts mounted on the bottom surface of the data reader (20). The data reader (20) further has two grooves (29) defined in opposite sides, wherein the two grooves (29) allow the data reader (20) to be fastened to the base (30).

Figure 4A:
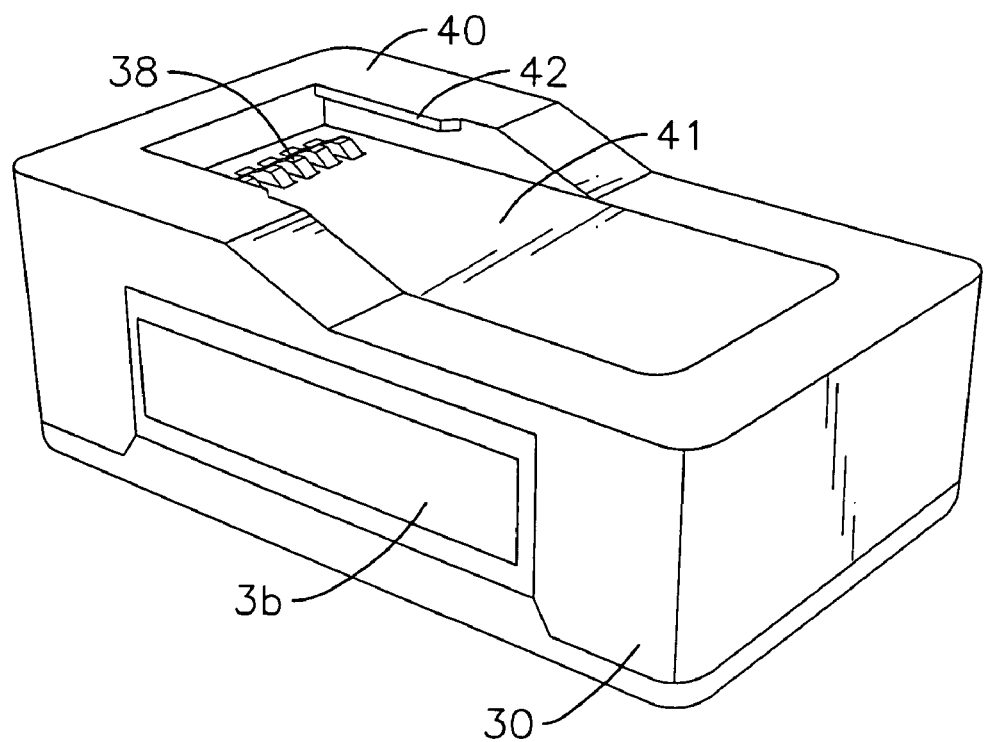
FIG. 4A is a perspective view of a base in accordance with the second embodiment of the present invention in FIG. 2.
Figure 4B:
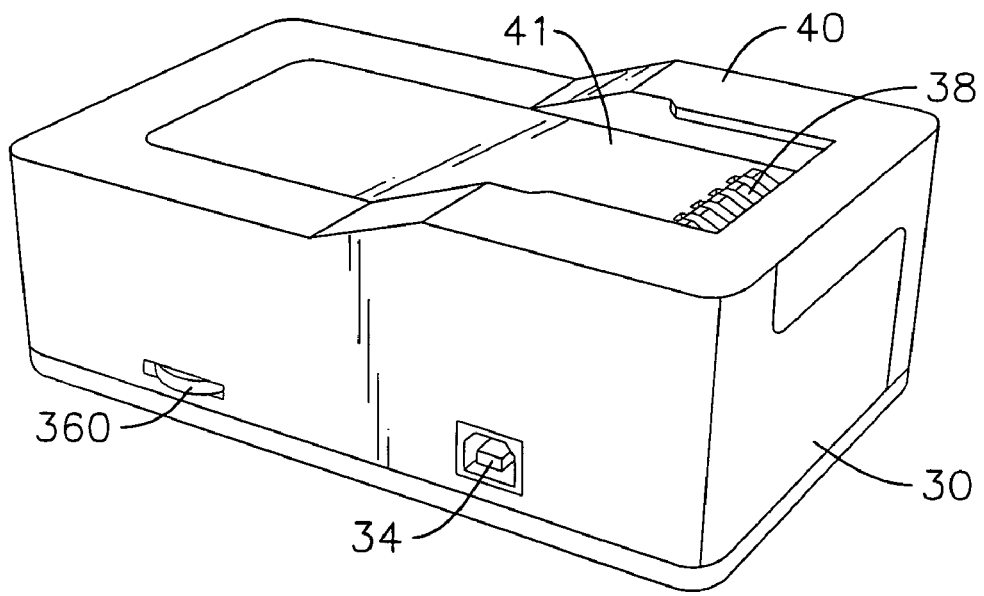
FIG. 4B is a perspective view of the base in FIG. 4A.
Figure 5:
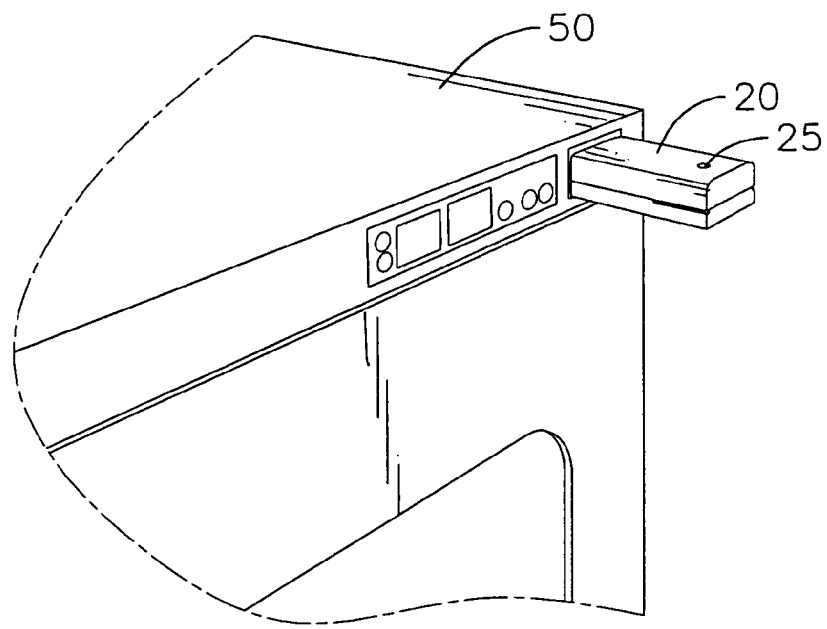
FIG. 5 is an operational perspective view of the data reader in FIG. 3A connected to an electrical moisture-proof cabinet.
Figure 6:
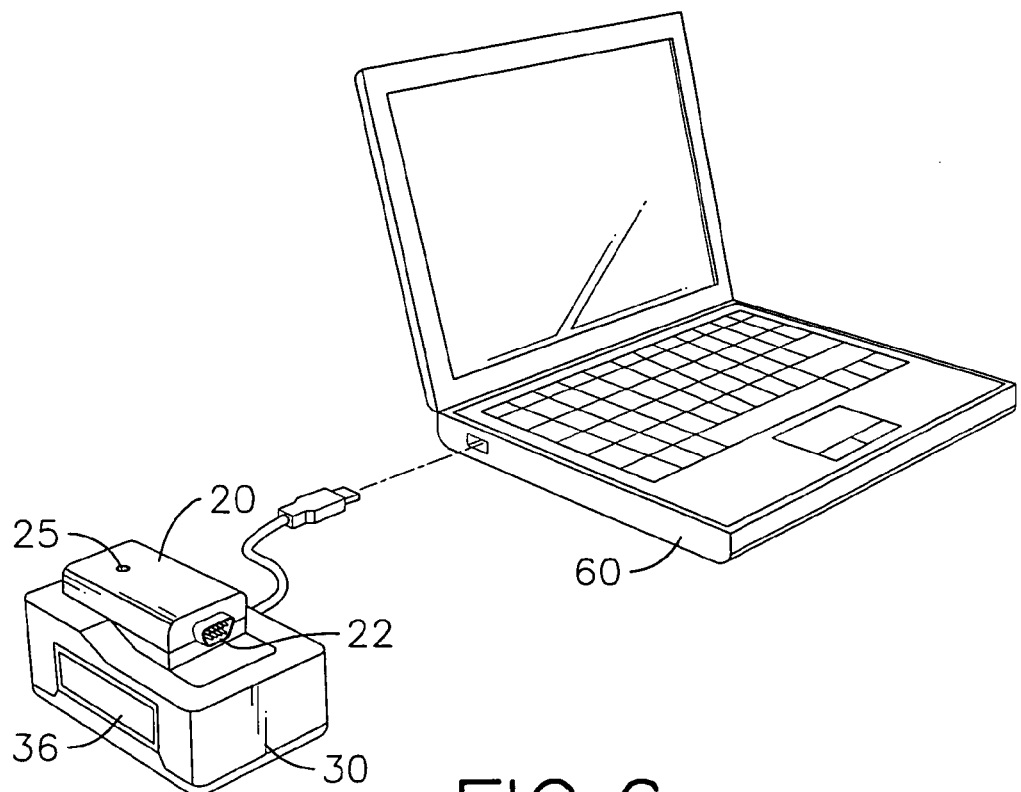
FIG. 6 is an operational perspective view in the data reader of FIG. 3A connected to the base in FIG. 4A.

With reference to FIGS. 4A and 4B, the base (30) has a top surface and side surfaces. A protruding U-shaped flange (40) is formed on the top surface to form an open platform (40) on the top surface to hold the data reader (20). Two ribs (42) are respectively formed along opposite inner edges of the U-shaped flange (40). When the data reader (20) is mounted on the base (30), the two ribs (42) of the base are respectively held in the grooves (29) of the data reader (20). The data receiving terminal (38) of the base (30) is formed of multiple contacts arranged on the top surface to electrically connect with the contacts (28) of the data reader (20). The USB port (34) and the LCD display (36) are mounted in opposite sides of the base (30). Further, an optional tuner (360) is mounted in one side of the base (30) to adjust the presented brightness of the LCD display (36). With reference to FIG. 5, when in use, the data reader (20) is connected to a corresponding RS232 port of a storage cabinet, such as an electrical moisture-proof cabinet (50), through the RS232 port (22). With reference to FIG. 6, after the status data of the electrical moisture-proof cabinet (50) have been accessed and collected by the data reader (20), the data reader (20) is detached from the electrical moisture-proof cabinet (50) and then electrically mounted on the base (30). The base (30) can be connected to an external computer (60) or a server through the USB port (34). The microprocessor (21) transmits the collected data to the computer (60). Based on the collected data, the computer (60) can generate statistical graphs to show temperature or humidity status. According to the graphs, control personnel can monitor whether or not the interior status of the electrical moisture-proof cabinet (50) is normal.

The data format transmitted from the data collector to the external computer can be expressed by an 11-byte value. Sequentially, the 11 bytes are 2 bytes for initial code, 2 bytes for humidity value, 1 byte for decimal value and positive/negative value of humidity, 2 bytes for temperature value, 1 byte for decimal value and positive/negative value of the temperature, 1 byte for check codes(check sum) and 2 bytes for ending code. The initial codes are "ABAB". The humidity and temperature are expressed by hexadecimal values. The decimal values as well as the positive/negative values for humidity and temperature are all expressed by 4 bits. The ending code is "0D 0A".

Further, the data format transmitted from the data collector to the external computer can be a 3-byte signal. Sequentially, the 3 bytes are one byte for initial code, one byte for humidity value and one byte for temperature value. The initial code is "AA". The humidity and temperature are expressed by hexadecimal values. Further, subtracting thirty from the temperature can derive the real temperature value.

In conclusion, the advantage of the present invention is that the data collector can automatically and precisely store the status data of an electrical storage cabinet to eliminate the need to designate an operator to regularly record the desired data. When the data collector is connected to a computer, the computer can generate statistical graphs to show the temperature or humidity status. According to the graphs, whether or not the interior status of the electrical storage cabinet is normal can be easily monitored.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A data collector to be mounted in an electrical storage device, the data collector comprising:
   a data transmission interface to be connected to the electrical storage device to read environment status data detected by the electrical storage device, wherein the data transmission interface receives a power signal from the electrical storage device;
   a buffer connected to the data transmission interface to temporarily store data received or to be transmitted;

a microprocessor connected to the buffer to process the received data or transmit the processed data to the buffer;

a memory connected to the microprocessor to store the executing code of the microprocessor; and a display connected to the microprocessor to show operating information of the microprocessor.

2. The data collector as claimed in claim 1, wherein the data transmission interface is a USB port or an RS-232 series port.

3. The data collector as claimed in claim 1, wherein the electrical storage device is an electronic moisture-proof device, an ultra low-moisture cabinet, a precision oven, an electronic moisture-proof coffer or a fireproof cabinet.

4. The data collector as claimed in claim 1, wherein the environment status data comprise temperature, humidify, time and current.

5. The data collector as claimed in claim 1, wherein the environment status data is expressed by an 11-bytes value, and the 11-bytes comprise 2 bytes for initial code, 2 bytes for humidity value, 1 byte for decimal value and positive/negative value of humidity, 2 bytes for temperature value, 1 byte for decimal value and positive/negative value of the temperature, 1 byte for check codes and 2 bytes for ending code.

6. A data collector to be mounted in an electrical storage device, the data collector comprising:
a data reader that has
a first data transmission interface to be connected to the electrical storage device to read environment status data detected by the electrical storage device, wherein the first data transmission interface receives a power signal from the electrical storage device;
a first buffer connected to the first data transmission interface to temporarily store data received or to be transmitted;
a microprocessor connected to the first buffer to process the received data or transmit the processed data to the first buffer; and
a memory connected to the microprocessor to store the executing code of the microprocessor;
a base electrically connected to the data reader, the base having
a second buffer to temporarily stores the data received or to be transmitted;
a second data transmission interface connected to the second buffer, wherein the data stored in the second buffer is transmitted through the second data transmission interface to an external computer; and
a display connected to the second buffer to show operating information of the microprocessor.

7. The data collector as claimed in claim 6, wherein first data transmission interface is a USB port or an RS-232 series port.

8. The data collector as claimed in claim 6, wherein second data transmission interface is a USB port or an RS-232 series port.

9. The data collector as claimed in claim 6, wherein the electrical storage device is an electronic moisture-proof device, an ultra low-moisture cabinet, a precision oven, an electronic moisture-proof coffer or a fireproof cabinet.

10. The data collector as claimed in claim 6, wherein the environment status data comprise temperature, humidify, time and current.

11. The data collector as claimed in claim 6, wherein the environment status data expressed by an 11-byte value, and the 11-bytes comprise 2 bytes for initial code, 2 bytes for humidity value, 1 byte for decimal value and positive/negative value of humidity, 2 bytes for temperature value, 1 byte for decimal value and positive/negative value of the temperature, 1 byte for check code and 2 bytes for ending code.

12. The data collector as claimed in claim 6, wherein the data reader has a rectangular body with a bottom surface, a top surface and side surfaces, wherein the first data transmission interface is formed on one side surface, a switch is mounted on the top surface to turn on or turn off the data reader, an indicating light is mounted on one side surface, and multiple contacts are formed on the bottom surface to be electrically connected to the base.

13. The data collector as claimed in claim 6, wherein the base has a top surface and side surfaces, a protruding U-shaped flange is formed on the top surface to construct an open platform to hold the data reader, multiple contacts are formed on the top surface to electrically connect to the data reader, and the second data transmission interface and the display are mounted in the side surfaces of the base.

14. The data collector as claimed in claim 12, wherein the base has a top surface and side surfaces, a protruding U-shaped flange is formed on the top surface to construct an open platform to hold the data reader, multiple contacts are formed on the top surface to electrically connect to the data reader, second data transmission interface and the display are mounted in the side surfaces of the base.

15. The data collector as claimed in claim 14, the base further having a tuner to adjust presented brightness of the display.

* * * * *